United States Patent Office 3,350,476
Patented Oct. 31, 1967

3,350,476
PROCESS FOR THE POLYMERIZATION OF ETHYLENICALLY UNSATURATED COMPOUNDS BY AN ALKALI METAL-BORON-TRIARYL CATALYST
Theodore J. Weismann, Ross Township, Allegheny County, and William M. Zarrella, Monroeville Borough, Allegheny County, Pa., assignors to Gulf Research & Development Company, Pittsburgh, Pa., a corporation of Delaware
No Drawing. Filed May 18, 1965, Ser. No. 456,809
18 Claims. (Cl. 260—878)

This invention relates to the anionic free radical polymerization of olefins.

The polymerization of olefins at high pressure using processes such as that disclosed by Fawcett et al. in U.S. 2,153,553 have been used in the past. More recently a number of olefin polymerization processes using low pressures of about atmospheric have been developed, exemplary of which is the Ziegler type polymerization process.

In most of these processes the polymer product has a rather wide distribution of molecular weight, that is, the molecular weight of the individual polymer chains is not constant. The reason for this is that the polymer is formed by a non-free radical reaction, that is, by an anionic or cationic mechanism. Normally polymerization reactions in the art are ended by adding a chain terminating agent, such as an alcohol or water which introduce impurities into the polymer.

A polymerization catalyst system has now been found which promotes the formation of polymers having a relatively narrow distribution of molecular weight; are capable of termination by a variation in the reaction temperature; and, in addition, the catalyst can be recovered and recycled for further use if desired.

In accordance with the invention, a substituted ethylene compound is polymerized in the presence of an alkali metal organo boron compound having the general formula:

$$Me_xBR_1R_2R_3$$

where:

Me is an alkali metal;
$x$ is an integer from 1 to 3;
B is boron;
$R_1$ is an aromatic organic radical; and
$R_2$ and $R_3$ are selected from the group consisting of an aromatic organic radical; and $$-CR_4R_5R_6$$

where:

$R_4$ and $R_5$ are selected from the group consisting of hydrogen and organic radicals; and
$R_6$ is selected from the group consisting of an aromatic organic radical and an alkyl aromatic organic radical where the alkyl portion of the alkyl aromatic organic radical contains less than 6 carbon atoms;

and where, in said substituted ethylene compound, one of the substituents is hydrogen and the second substituent on the same ethylenic carbon atom containing the hydrogen is selected from the group consisting of hydrogen and phenyl, said alkali metal organo boron compound being at least partially dissolved in a liquid inert solvent medium which has an electron affinity less than the electron affinity of said substituted ethylene compound and less than the electron affinity of the organo boron portion of the alkali metal organo boron compound.

The olefinic charge stock for the process of this invention can be any substituted ethylene where one of the substituents is hydrogen and the second substituent on the same ethylenic carbon atom containing the hydrogen is selected from the group consisting of hydrogen and phenyl. The substituted ethylenes which are suitable in the process of this invention can be represented by the general formula:

where $R_7$ is selected from the group consisting of hydrogen and phenyl and $R_8$ and $R_9$ are selected from the group consisting of hydrogen and organic radicals. The preferred olefins are the alpha olefins, that is, where $R_7$ in the above formula is hydrogen. The more preferred olefins are the vinyl substituted aromatic olefins, that is, where $R_7$ above is hydrogen and at least one of $R_8$ and $R_9$ is an aromatic organic radical, preferably phenyl. The olefins suitably have between 2 and 45 carbon atoms per molecule and more preferably have between 2 and 14 carbon atoms per molecule.

In the above formula $R_8$ and $R_9$ are selected from the group consisting of hydrogen and organic radicals. By organic radicals is meant other saturated or unsaturated, linear, branched or cyclic hydrocarbon radicals; heterocyclic radicals; hydrocarbon radicals substituted with halogens and/or groups such as ester, ether and —CN groups etc. The process of this invention is also useful for copolymerizing substituted ethylenic compounds having the above general formula. Therefore mixtures of substituted ethylenic compounds can be employed, or as will be described below, the substituted ethylenic compounds can be added in sequence to the reaction zone.

Suitable substituted ethylenic compounds include, but are not limited to:

Ethylene and other normal 1-olefins such as 1-butene, 1-hexene, 1-decene, and 1-octadecene;
Diolefins, such as diisobutylene;
Branched 1-olefins such as isobutylene and isooctene;
Vinyl esters such as vinyl acetate; vinyl ethers; esters of acrylic and methacrylic acid such as methylacrylate and methylmethacrylate;
Monoaryl ethylenes such as styreen and anthrylethylene;
1,1-diaryl ethylenes such as 1,1-di(alpha-naphthyl)ethylene and 1,1-di(beta-phenanthryl)ethylene;
1,2-diaryl ethylenes such as stilbene and 1,2-di(alpha-naphthyl)ethylene;
1,1- or 1,2-alkyl aryl ethylenes such as 1-methyl-1-phenyl-ethylene and 1-methyl-2(alpha-naphthyl)ethylene;
1,1,2-triaryl ethylenes such as 1,1,2-triphenylethylene and 1,1,2-trianthrylethylene;
Mono alkaryl, 1,1-dialkaryl, 1,2-dialkaryl, or 1,1,2-trialkaryl ethylenes such as 1-methyl-beta-naphthylethylene, 1,2-di(o-tolyl)ethylene, or 1,1,2-tri(o-ethylphenyl)ethylene;
Monocycloalkyl and 1,1-dicycloalkyl ethylenes such as cyclohexylethylene, 1,1 - dicyclopentylethylene, 4-methycyclohexylethylene, and 3-phenylcyclopentylethylene;
Mono- and 1,1-di-heterocyclic substituted ethylenes (and their alkyl or aryl substituted analogs) such as furanylethylene, 1,1-di(5-methylthiophenyl)ethylene, piperidylethylene, and benzthiophenylethylene.

The catalyst for use in the process of this invention is an alkali metal organo boron compound having the general formula:

$$Me_xBR_1R_2R_3$$

where:
Me is an alkali metal, that is, lithium, sodium, potassium, rubidium and cesium;
$x$ is an integer from 1 to 3;
B is boron;
$R_1$ is an aromatic organic radical; and
$R_2$ and $R_3$ are selected from the group consisting of an aromatic organic radical; and $$-CR_4R_5R_6$$

where:
$R_4$ and $R_5$ are selected from the group consisting of hydrogen and organic radicals; and
$R_6$ is selected from the group consisting of an aromatic organic radical and an alkyl aromatic organic radical where the alkyl portion of the alkyl aromatic organic radical contains less than 6 carbon atoms;

and where, in the substituted ethylene compound, one of the substituents is hydrogen and the second substituent on the same ethylenic carbon atom containing the hydrogen is selected from the group consisting of hydrogen and phenyl, said alkali metal organo boron compound being at least partially dissolved in a liquid inert solvent medium which has an electron affinity less than the electron affinity of said substituted ethylene compound and less than the electron affinity of the organo boron portion of the alkali metal organo boron compound.

By an organic radical is meant any aryl, alkaryl, or aromatic heterocyclic radicals, where the hetero atom is selected from the group consisting of oxygen, nitrogen and sulfur. Preferably the aromatic organic radicals have between one and six rings, inclusive. The alkali metal triaryl boron compounds are the preferred catalysts in this reaction and particularly preferred is sodium trimesitylboron and sodium tri-alpha-naphthylboron. It was unexpected that the alkali metal organo boron catalysts defined above would be useful for the anionic free radical polymerization of the defined substituted ethylenes. It was expected that the bulky aryl groups of the organo boron anion would interfere with the required closeness of approach of the olefin monomer to effect electron transfer. Because the electron in the organo boron anionic free radical is localized near the boron and is shielded by the bulky aryl containing organo portion of the molecule, the catalytic effectiveness of these compounds could not be predicted.

Examples of suitable alkali metal organo boron compounds useful as catalysts in the process of this reaction include, but are not limited to:

Alkali metal triarylborons such as Na triphenylboron, Na tri-alpha-naphthylboron, K tri-1-anthrylboron, and Na tribenzperylenylboron;

Alkali metal trialkarylborons such as Na tri-o-tolylboron, Rb tri(p-ethylphenyl)boron, Cs tri(2,4-dimethylphenyl) boron, Na tri(3,5-dimethylphenyl)boron, K trimesitylboron, Na tri(2,4,6-trimethylphenyl)boron, Na tri(1-methyl-beta-naphthyl)boron, and K tri(1-methyl-beta-phenanthryl)boron;

Alkali metal trialkoxyarylborons such as Na tri-o-anisylboron, K tri(p-ethoxyphenyl)boron, Cs tri(m-phenoxyphenyl)boron, and Rb tri(1-methoxy-beta-naphthyl) boron;

Alkali metal tri(amino aryl) and tri(alkylamino aryl)-borons such as Na tri-o-anilinoboron, Na tri-m-methylanilinoboron, and K tri-p-dimethyl-anilinoboron;

Alkali metal diaryl-aralkylborons such as Na dimesitylbenzylboron, Na di(o-tolyl)-6-phenylhexylboron, and K di(alpha-naphthyl)-(1-methyl-4-phenyl)butylboron;

Alkali metal diaryl-heteroaromaticalkyl borons such as Na di(p-anilino)-2-thiophenylethylboron, and K di(1-anthryl)-3-furanylpropylboron;

Alkali metal diaralkyl-arylborons such as Na dibenzyl-alpha-naphthylboron, and K bis(4-phenylbutyl)-mesitylboron; and Alkali metal diheteroaromaticalkyl-arylborons such as Na bis[(2-methyl-4-thiophenyl)butyl]-o-tolylboron, and K bis(3-pyridyl propyl)-beta-phenanthrylboron.

Also required for the process of this invention is the presence of a liquid inert solvent medium which has an electron affinity less than the electron affinity of the substituted ethylene charge stock and less than the electron affinity of the organo boron portion of the alkali metal organo boron compound. The function of the solvent is to at least partially dissolve the alkali metal organo boron compound so as to allow the anionic free radical portion, namely the organo boron portion, to dissociate and come into contact with the olefinic monomer. The electron affinity of the solvent must be as defined above so that the solvent will not react preferentially with the olefinic monomer free radical ion or the alkali metal organo boron catalyst.

The solvent must also be inert, that is, be free of any groups which will react with the catalyst to give a salt or adduct. Such groups are well-known in the art and include —OH, carboxylic acids, etc. The solvents must be liquid in order to allow for the dissociation of the alkali metal organo boron catalyst, the more preferred solvents being those which promote the dissociation, that is, those which have the higher dielectric constants. Solvents having dielectric constants between about 2.8 and 40 at 25° C. are therefore preferred. Most preferred are those solvents which substantially completely dissolve the alkali metal organo boron compound.

The solvent must also, of course, be non-aqueous since water or other hydroxyl-containing material will attack the alkali metal catalyst. More generally, the solvent must be inert, that is, be free of any groups which will react with the catalyst. Such groups are well known in the art and include, for example, hydroxyl (—OH); sulfhydril (SH); amino ($NH_2$); imino (NH); ketones; inorganic or organic acids; and aldehydes. These undesirable components can be generally classified as those containing an active hydrogen. All of these groups when added to sodium give a salt or adduct and will thus interfere wtih the desired reaction.

Ethers form a preferred class of solvents. Thus, cyclic ethers such as tetrahydrofuran, tetrahydropyran and dioxane are suitable. Polysubstituted ethers such as dimethoxyethane and cellosolve are suitable as are the alkyl aryl ethers, such as butyl phenyl ether, and diaryl ethers such as diphenyl ether. Polyphenyl ethers are also useful as solvents in the process of this reaction. While aromatic and saturated hydrocarbons, such benzene, hexane, hexadecane, etc. do not form a preferred class of solvents (their dielectric constants are less than 2.8), they can be used. Mixtures of the above solvents can also be used to obtain the desired solvent dielectric properties.

As noted above, the catalyst is preferably substantially completely dissolved in the solvent. Since this is an anionic free radical catalyzed polymerization reaction, very minute amounts of catalyst are sufficient to initiate the reaction, polymer growth then proceeding until all of the olefinic monomer is used up. Amounts of catalyst as low as $10^{-6}$ molar with respect to the solvent can suitably be used. Higher concentrations, as high as 1 molar or more, can also be employed. The preferred catalyst concentration is between $10^{-4}$ and $10^{-2}$ molar with respect to the solvent. The catalyst can at times form solid ion clusters which appear to be substantially insoluble in the reaction medium. However, in order to promote the polymerization reaction by an anionic free radical mechanism, at least a portion of the catalyst, theoretically as little as one molecule, should be soluble in the reaction solvent. Although solution of the catalyst is preferred, the reaction may be carried out in the presence of insoluble catalyst wherein either the monomer-catalyst intermediate or the monomer-catalyst reaction products are soluble, thus promoting the availability of additional catalyst surface. The presence of impurities which react with the catalyst and/or charge stock will, of course, serve to remove a certain amount of catalyst from the reaction zone and thus additional quantities of catalyst would be required as a purifying means.

The alkali metal organo boron catalyst can be prepared by any suitable procedure. For example, the alkali metal organo boron catalyst can be prepared by the procedures described in E. Krause and R. Nitsche, Ber. 55, 1261 (1922); and H. C. Brown and V. H. Dodson, JACS 79, 2302 (1957); or the articles entitled "Triarylboron Anions. I. Magnetic and Cryoscopic Studies of Monovalent Trimesitylboron Anion Solutions" by Ting Li Chu and Theodore J. Weismann, JACS, 78, 23 (1956); and "Triarylboron Anions. II. Tri-beta-methylnaphthylboron" by Ting Li Chu and Theodore J. Weismann in JACS, 76, 3610 (1956). For example, referring to the first mentioned article by Ting Li Chu and Theodore J. Weismann, trimesitylboron was allowed to react with sodium in tetrahydrofuran as a solvent. It is preferred that the alkali metal organo boron catalyst be prepared as close in point of time to using the catalyst as is possible due to the reactive nature of the compounds. They must, of course, be kept out of contact of any gas containing free molecular oxygen or of any hydroxyl containing material such as water. For purposes of ease of separation afterward, it is additionally preferred that the solvent used in preparing the alkali metal organo boron catalyst be utilized as the solvent in the subsequent polymerization reaction.

The pressure used in the polymerization reaction is not critical and can vary over a wide range. Atmospheric pressure is preferred but pressures ranging as high as 10,000 pounds per square inch or higher can be used if desired. Reduced pressures can also be used. An inert atmosphere must, of course, always be used which is free of oxygen, water and any other material which reacts with the catalyst. The reaction time will depend on the reaction temperature and catalyst concentrations, the reaction time decreasing as reaction temperature and catalyst concentration increases. In general, reaction times between five minutes and four hours are satisfactory.

While it is not certain, it is believed that the anionic free radical portion of the alkali metal organo boron catalyst after dissociation transfers its electron to one molecule of the substituted ethylene charge stock to create an anionic free radical monomer. This anionic free radical monomer can then react with additional molecules of the substituted ethylene charge stock to produce the desired polymers. The organo boron portion of the catalyst, which was stabilized by giving up its electron to the substituted ethylene monomer, is now capable of re-accepting the odd electron from the polymer and associating with the sodium ion in order to terminate the polymer chain. This termination of the polymerization reaction can be controlled by varying the temperature of the reaction mixture in such a manner as to take advantage of the differences in electron affinity of the anionic free radical polymer and the organo boron radical because of the temperature dependence of ion pair association of the organo boron anion and the alkali metal cation. That is, as the temperature of the reaction mixture is decreased, there is less tendency for the alkali metal and organo boron portions of the catalysts to dissociate. Thus, by lowering the temperature sufficiently, the polymerization reaction will cease since the catalyst no longer dissociates. In addition, because this reaction is a free radical promoted polymerization, the initiation of polymer chains is directly dependent upon the concentration of free radicals in the reaction mixture. The reaction will proceed, unless a chain terminating agent such as water or alcohol is deliberately added, until all of the olefinic charge stock is used up. Upon the addition of more olefin, the reaction will resume and the molecular weight of the product will increase. Because of the instantaneous nature of the reaction, the molecular weight distribution of the polymer chains will be very narrow provided the reaction temperature is not fluctuated so widely during the reaction that the alkali metal organo boron catalyst is reformed or regenerated by terminating the free radical nature of the growing polymer chain. So long, therefore, as the free radical nature of the growing polymer chain is maintained by reaction temperature, the olefinic nature of the charge stock can be varied to produce block copolymers. If desired, mixtures of polymers can be formed by lowering the reaction temperature to reform the alkali metal organo metal boron catalyst, adding a second olefinic monomer, and reinitiating the reaction. While some of the polymer chains will form free radicals, the free radicals will preferentially form on the low molecular weight newly added monomer to start new polymer chain growth. Any combination of the above results can be achieved depending upon the degree of fluctuation of the reaction temperature. That is, partial block copolymerization can occur and a partial mixture of polymers by the sequential addition of olefins, such as styrene and stilbene, depending on how the reaction temperature is fluctuated. In general, the reaction temperature can vary between about −60° C. and +100° C. The preferred reaction temperatures are between 15° and 40° C.

The invention will be further described with reference to the following examples. A solution of sodium trimesitylboron was prepared by the reaction of 64.2 milligrams of trimesitylboron with an excess of metallic sodium in approximately 10 grams of tetrahydrofuran at 25° C. Trimesitylboron adds only one sodium atom under these conditions. This free radical solution, free of metallic sodium, was added to a solution comprising 30 grams of styrene and 30 grams of tetrahydrofuran. The blue color of the sodium trimesitylboron solution disappeared with the appearance of a red color in the mixture. The reaction temperature was 25° C. The pressure of the system initially was that of the vapor pressure of the solvent-monomer solution. The red color persisted for several hours as the solution continued to polymerize. After completion of the reaction, excess solvent tetrahydrofuran was removed from the polymer by prolonged vacuum distillation at room temperature. The molecular weight of the polymer was determined by the intrinsic viscosity method utilizing the Mark-Houwink relationship as described by P. J. Flory in Principles of Polymer Chemistry (Cornell University Press, Ithaca, N.Y., pages 310–312 (1953)). A value for $(n)$ in the Mark-Houwink relationship of 0.418 deciliter per gram was obtained. The molecular weight for the polystyrene formed was calculated as 75,100.

The temperature dependence of the polymerization reaction system was demonstrated by forming a dilute solution of styrene and sodium trimesitylboron at room temperature. This solution exhibited the characteristic absorption of a styrene anion radical. On reducing the temperature to −23° C., the solution became yellow and then colorless. At −75° C., the absorption corresponding to the sodium trimesitylboron reappeared. The process was reversible over a period of two days.

Variations and modifications can be made within the scope of the invention and the attached claims.

We claim:
1. A process which comprises polymerizing a 1,2 ethylenically unsaturated compound, having on the 1 carbon atom a first hydrogen atom substituent and a second substituent selected from the group consisting of hydrogen and phenyl, under polymerization conditions in the pres- ence of an alkali metal organo boron compound having the general formula:

$$Me_xBR_1R_2R_3$$

where:
- Me is an alkali metal;
- x is an integer from 1 to 3;
- B is boron;
- $R_1$ is an aromatic organic radical; and
- $R_2$ and $R_3$ are selected from the group consisting of an aromatic organic radiacal; and $$-CR_4R_5R_6$$

where:
- $R_4$ and $R_5$ are selected from the group consisting of hydrogen and organic radicals; and $R_6$ is selected from the group consisting of an aromatic organic radical and an alkyl aromatic organic radical where the alkyl portion of the alkyl aromatic organic radical contains less than 6 carbon atoms;

said alkali metal organo boron compound being at least partially dissolved in a liquid inert solvent medium which has an electron affinity less than the electron affinity of said substituted ethylene compound and less than the electron affinity of the organo boron portion of the alkali metal organo boron compound, said aromatic organic radical being selected from the group consisting of aryl, alkaryl, alkoxyaryl, amino aryl, and aromatic heterocyclic radicals, where the hetero atom is selected from the group consisting of oxygen, nitrogen, and sulfur; and said organic radical being selected from the group consisting of aryl, alkaryl, and aromatic heterocyclic radicals, where the hetero atom is selected from the group consisting of oxygen, nitrogen, and sulfur.

2. A process according to claim 1 wherein said alkali metal is sodium.

3. A process according to claim 1 wherein said 1,2 ethylenically unsaturated compound is a vinyl aromatic.

4. A process according to claim 3 wherein said substituted ethylene compound is a vinyl aromatic and said alkali metal organo boron compound is an alkali metal triarylboron compound.

5. A process according to claim 1 wherein said solvent has a dielectric constant between 2.8 and 40.

6. A process according to claim 5 wherein said solvent is tetrahydrofuran.

7. A process which comprises polymerizing a vinyl aromatic monomer under polymerization conditions including a temperature between −60° and +100° C. in the presence of an alkali metal organo boron compound having the general formula:

$$Me_xBR_1R_2R_3$$

where:
- Me is an alkali metal;
- x is an integer from 1 to 3;
- B is boron;
- $R_1$ is an aromatic organic radical; and
- $R_2$ and $R_3$ are selected from the group consisting of an aromatic organic radical; and $$-CR_4R_5R_6$$

where:
- $R_4$ and $R_5$ are selected from the group consisting of hydrogen and organic radicals; and $R_6$ is selected from the group consisting of an aromatic organic radical and an alkyl aromatic organic radical where the alkyl portion of the alkyl aromatic organic radical contains less than 6 carbon atoms;

said alkali metal organo boron compound being substantially completely dissolved in a liquid inert solvent medium which has an electron affinity less than the electron affinity of said vinyl aromatic nonomer and less than the electron affinity of the organo boron portion of the alkali metal organo boron compound, said aromatic organic radical being selected from the group consisting of aryl, alkaryl, alkoxyaryl, amino aryl, and aromatic heterocyclic radicals, where the hetero atom is selected from the group consisting of oxygen, nitrogen, and sulfur; and said organic radical being selected from the group consisting of aryl, alkaryl, and aromatic heterocyclic radicals, where the hetero atom is selected from the group consisting of oxygen, nitrogen, and sulfur.

8. A process according to claim 7 wherein said vinyl aromatic is styrene.

9. A process according to claim 7 wherein said solvent is an ether.

10. A process according to claim 7 wherein said alkali metal organo boron compound is an alkali metal triarylboron compound.

11. A process which comprises polymerizing styrene under polymerization conditions including a temperature between −60° and +100° C. and low pressure in the presence of an alkali metal triarylboron compound which is at least partially dissolved in a liquid inert solvent which has an electron affinity less than the electron affinity of styrene and less than the electron affinity of the organo boron portion of the alkali metal organo boron compound.

12. A process according to claim 11 wherein said alkali metal organo boron compound is sodium trimesitylboron and said solvent is tetrahydrofuran.

13. A process for polymerizing a vinyl aromatic monomer which comprises:
(1) preparing an alkali metal organo boron compound having the general formula:

$$Me_xBR_1R_2R_3$$

where:
- Me is an alkali metal;
- x is an integer from 1 to 3;
- B is boron;
- $R_1$ is an aromatic organic radical; and
- $R_2$ and $R_3$ are selected from the group consisting of an aromatic organic radical; and $$-CR_4R_5R_6$$

where:
- $R_4$ and $R_5$ are selected from the group consisting of hydrogen and organic radicals; and $R_6$ is selected from the group consisting of an aromatic organic radical and an alkyl aromatic organic radical where the alkyl portion of the alkyl aromatic organic radical contains less than 6 carbon atoms;

by adding an alkali metal to the appropriate organo boron compound in the presence of a liquid inert solvent having a dielectric constant greater than 2.8 and an electron affinity less than the organo boron compound and vinyl aromatic monomer; said solvent dissolving at least a portion of the formed compound; and (2) thereafter contacting said alkali metal organo boron compound and solvent with said vinyl aromatic monomer under polymerization conditions;

(3) said aromatic organic radical being selected from the group consisting of aryl, alkaryl, alkoxyaryl, amino aryl, and aromatic heterocyclic radicals, where the hetero atom is selected from the group consisting of oxygen, nitrogen, and sulfur; and said organic radical being selected from the group consisting of aryl, alkaryl, and aromatic heterocyclic radicals, where the hetero atom is selected from the group consisting of oxygen, nitrogen, and sulfur.

14. A process according to claim 13 wherein said vinyl aromatic monomer is styrene.

15. A process according to claim 14 wherein said alkali metal organo boron catalyst is sodium trimesitylboron.

16. A process according to claim 15 wherein said solvent is tetrahydrofuran.

17. A process for the production of block co-polymers of ethylenically unsaturated compounds which comprises:

(1) polymerizing a first 1,2 ethylenically unsaturated compound under polymerization conditions including a temperature between −60° and +100° C. in the presence of an alkali metal organo boron compound having the general formula:

$$Me_xBR_1R_2R_3$$

where:
Me is an alkali metal;
$x$ is an integer from 1 to 3;
B is boron;
$R_1$ is an aromatic organic radical; and
$R_2$ and $R_3$ are selected from the group consisting of an aromatic organic radical; and $$-CR_4R_5R_6$$

where:
$R_4$ and $R_5$ are selected from the group consisting of hydrogen and organic radicals; and $R_6$ is selected from the group consisting of an aromatic organic radical and an alkyl aromatic organic radical where the alkyl portion of the alkyl aromatic organic radical contains less than 6 carbon atoms;
said alkali metal organo boron compound being at least partially dissolved in a liquid inert solvent medium which as an electron affinity less than the electron affinity of said substituted ethylene compound and less than the electron affinity of the organo boron portion of the alkali metal organo boron compound;

(2) maintaining the reaction conditions while adding a second 1,2 ethylenically unsaturated compound;

(3) said first and second 1,2 ethylenically unsaturated compounds having on the 1 carbon atom a first hydrogen atom substituent and a second substituent selected from the group consisting of hydrogen and phenyl;

(4) said aromatic organic radical being selected from the group consisting of aryl, alkaryl, alkoxyaryl, amino aryl, and aromatic heterocyclic radicals, where the hetero atom is selected from the group consisting of oxygen, nitrogen, and sulfur; and said organic radical being selected from the group consisting of aryl, alkaryl, and aromatic heterocyclic radicals, where the hetero atom is selected from the group consisting of oxygen, nitrogen, and sulfur.

18. A process for the production of a mixture of polymers by the sequential addition of 1,2 ethylenically unsaturated compounds to a reaction mixture which comprises:

(1) polymerizing a first 1,2 ethylenically unsaturated compound under polymerization conditions including a temperature between −60° and +100° C. in the presence of an alkali metal organo boron compound having the general formula:

$$Me_xBR_1R_2R_3$$

where:
Me is an alkali metal;
$x$ is an integer from 1 to 3;
B is boron;
$R_1$ is an aromatic organic radical; and
$R_2$ and $R_3$ are selected from the group consisting of an aromatic organic radical; and $$-CR_4R_5R_6$$

where:
$R_4$ and $R_5$ are selected from the group consisting of hydrogen and organic radicals; and $R_6$ is selected from the group consisting of an aromatic organic radical and an alkyl aromatic organic radical where the alkyl portion of the alkyl aromatic organic radical contains less than 6 carbon atoms;

(2) reducing the reaction temperature until the alkali metal organo boron compound is substantially undissociated; and (3) thereafter adding a second 1,2 ethylenically unsaturated compound and increasing the reaction temperature to between −60° and +100° C., said first and second 1,2 ethylenically unsaturated compounds having on the 1 carbon atom a first hydrogen substituent and a second substituent selected from the group consisting of hydrogen and phenyl;

(4) said aromatic organic radical being selected from the group consisting of aryl, alkaryl, alkoxyaryl, amino aryl, and aromatic heterocyclic radicals, where the hetero atom is selected from the group consisting of oxygen, nitrogen, and sulfur; and said organic radical being selected from the group consisting of aryl, alkaryl, and aromatic heterocyclic radicals, where the hetero atom is selected from the group consisting of oxygen, nitrogen, and sulfur.

References Cited

Chu and Weismann: "Triarylboron Anions," Journal of the American Chemical Society, vol. 78, pp. 23–26.

SAMUEL H. BLECH, *Primary Examiner.*

D. J. BREZNER, *Assistant Examiner.*